United States Patent
Favero

(10) Patent No.: US 12,209,219 B2
(45) Date of Patent: Jan. 28, 2025

(54) COMPOSITION FOR OIL AND GAS RECOVERY

(71) Applicant: SNF GROUP, Andrezieux Boutheon (FR)

(72) Inventor: Cédrick Favero, Andrezieux Boutheon (FR)

(73) Assignee: SNF GROUP, Andrezieux Boutheon (FR)

(*) Notice: Subject to any disclaimer, the term of this patent is extended or adjusted under 35 U.S.C. 154(b) by 2 days.

(21) Appl. No.: 17/754,796

(22) PCT Filed: Nov. 5, 2020

(86) PCT No.: PCT/EP2020/081025
§ 371 (c)(1),
(2) Date: Apr. 12, 2022

(87) PCT Pub. No.: WO2021/094174
PCT Pub. Date: May 20, 2021

(65) Prior Publication Data
US 2023/0357627 A1    Nov. 9, 2023

Related U.S. Application Data

(60) Provisional application No. 62/934,723, filed on Nov. 13, 2019.

(51) Int. Cl.
*C09K 8/68* (2006.01)

(52) U.S. Cl.
CPC .................................. *C09K 8/685* (2013.01)

(58) Field of Classification Search
None
See application file for complete search history.

(56) References Cited

U.S. PATENT DOCUMENTS

| | | | | |
|---|---|---|---|---|
| 4,670,501 A | * | 6/1987 | Dymond | C09K 8/32 507/119 |
| 5,266,646 A | * | 11/1993 | Eisenhart | C09D 7/43 525/902 |
| 8,186,871 B2 | | 5/2012 | Pich et al. | |
| 11,155,749 B1 | * | 10/2021 | Favero | E21B 43/20 |
| 2013/0255954 A1 | | 10/2013 | Favero et al. | |
| 2014/0131039 A1 | * | 5/2014 | Reichenbach-Klinke | C09K 8/584 166/270.1 |
| 2016/0333253 A1 | | 11/2016 | Logan et al. | |
| 2018/0362833 A1 | * | 12/2018 | Jackson | C08F 20/56 |
| 2020/0216748 A1 | * | 7/2020 | Yang | C09K 8/88 |
| 2021/0355258 A1 | | 11/2021 | Favero et al. | |

FOREIGN PATENT DOCUMENTS

| | | |
|---|---|---|
| CN | 106 928 960 A | 7/2017 |
| FR | 3088068 A | 5/2018 |
| WO | 2017/187150 A1 | 11/2017 |
| WO | 2018/172676 A1 | 9/2018 |
| WO | 2019/115619 A1 | 6/2019 |

OTHER PUBLICATIONS

International Search Report (and English Translation) and Written Opinion for PCT/EP2020/081025, mailed Feb. 4, 2021.

* cited by examiner

*Primary Examiner* — John J Figueroa
(74) *Attorney, Agent, or Firm* — HESLIN ROTHENBERG FARLEY & MESITI P.C.

(57) ABSTRACT

The invention relates to a composition for preparing injection fluid in oil and gas recovery comprising an inverse emulsion of an associative water-soluble polymer A comprising at least one hydrophobic monomer or hydrophobic macromonomer, and solid particles of a water-soluble polymer B, said polymer B being preferably associative. The invention also relates to a method of treating a portion of subterranean formation comprising providing the composition, preparing an injection fluid with at least the composition, introducing the injection fluid into portion of the subterranean formation. The composition is particularly useful to prepare fracturing fluid in fracturing operations.

20 Claims, No Drawings

COMPOSITION FOR OIL AND GAS RECOVERY

CROSS REFERENCE TO RELATED APPLICATIONS

This application is a national stage filing under section 371 of International Application No. PCT/EP2020/081025, filed on Nov. 5, 2020, and published on May 20, 2021 as WO 2021/094174, which claims priority to U.S. provisional application No. 62/934,723, filed on Nov. 13, 2019. The entire contents of WO 2021/094174 are hereby incorporated herein by reference.

FIELD OF THE INVENTION

The present invention relates to a new composition comprising water soluble polymers for treating a portion of a subterranean formation. The present invention also refers to a method for treating a portion of a subterranean formation and especially to a method for recovering oil and gas, wherein the composition is used. The composition is particularly useful to prepare fracturing fluid in fracturing operations, and injection fluid in Chemical Enhanced Oil Recovery (EOR).

BACKGROUND

Water-soluble polymers are widely used in oil and gas recovery processes, such as enhanced oil recovery and hydraulic fracturing operations, but also other stimulation, cementing, drilling operations or completion operations. Water-soluble polymers are generally in solution form, in inverse emulsion form, in powder form, or in dispersion form. Each of them has known advantages and drawbacks.

In the oil and gas industry, there is generally a need for highly concentrated version of polymer composition, easily useable, and hence preferably in liquid form. The document WO2017/187150 proposes a formulation prepared by mixing a granulated water-soluble friction reducing polymer with an inverse polymer emulsion. This offers a liquid composition that does not require specialized equipment, and which is found to be technically advantageous and cost-effective. More precisely, the composition affords friction reducing performances that matches or surpasses previous friction reducers. The level of friction reduction is higher and reached faster.

In oil and gas operations, fluids that are injected into a subterranean formation may comprise particles or colloids. In that case, the particles or colloids have to be suspended in the fluid in order to avoid any sedimentation and inhomogeneity of the dispersed particles. Viscosifying polymers are generally used for that purpose in injection fluid compositions. However, the injection fluid composition is generally exposed to high shear conditions and the viscosifying polymers which are generally shear thinning do not afford satisfactory results.

There is a need to improve the viscosity and/or the suspensive effect(s) of water-soluble polymers used in oil and gas recovery processes, especially when high shear conditions are encountered.

In fracturing operation, especially when High Viscosity Friction Reducers (HVFR) are used, the dosage of said HVFR is important and there is a need to improve their efficiency at same dosage, or to have the same efficiency at lower dosage.

The applicant has developed a new composition made with a combination of specific water-soluble polymers and that offers solutions to the problem above described.

SUMMARY OF THE INVENTION

In a first aspect, the present invention provides a composition for preparing an injection fluid in oil and gas recovery comprising:
  an inverse emulsion of an associative water-soluble polymer A comprising at least one hydrophobic monomer or one hydrophobic macromonomer,
  solid particles of a water-soluble polymer B.

In a preferred embodiment, the composition for preparing an injection fluid in oil and gas recovery comprises:
  an inverse emulsion of an associative water-soluble polymer A comprising at least one hydrophobic monomer or one hydrophobic macromonomer, and acrylamide,
  solid particles of an associative water-soluble polymer B comprising at least one hydrophobic monomer or one hydrophobic macromonomer, and acrylamide.

In a second aspect, the invention provides an injection fluid for oil and gas recovery process, said fluid being prepared with the composition of the invention. The injection fluid may be a polymer flooding injection fluid or a fracturing fluid.

In a third aspect, the present invention provides a method of treating a portion of subterranean formation comprising providing the composition of the invention, preparing an injection fluid with at least said composition, introducing the injection fluid into portion of the subterranean formation.

Treating a portion of a subterranean formation includes treating part of the subterranean formation or treating the entire subterranean formation.

In a fourth aspect, the invention provides a fracturing method comprising providing the composition of the invention, preparing a fracturing fluid with at least said composition and with at least a proppant, introducing the fracturing fluid into portion of the subterranean formation.

In a fifth aspect, the invention provides a polymer flooding method comprising providing composition of the invention, preparing a polymer flooding injection fluid with at least said composition, introducing the polymer flooding injection fluid into portion or the entire subterranean formation.

In a sixth aspect, the invention provides a method of improving the suspensive properties in an injection fluid comprising providing the composition of the invention, preparing the injection fluid by mixing said composition in water, sea water or brine, introducing the injection fluid into portion or the entire subterranean formation. The aqueous treatment fluid may be a fracturing fluid or a polymer flooding injection fluid. In other words, this method consists in improving the suspension of particles or colloids that are present in an injected fluid.

DETAILED DESCRIPTION OF THE INVENTION

It has been discovered that a composition comprising the combination of an inverse emulsion of an associative water-soluble polymer A, and solid particles of a water-soluble polymer B, said polymer B being preferably associative, leads to an improvement of the suspensive effect, even in high brines, and even in high shear conditions.

The suspensive effect refers to the suspension of particles or colloids that are present in an injection fluid and/or an injected fluid. This corresponds to the capacity that the composition of the invention gives to the injection fluid to suspend particles or colloids such as proppant, and to avoid sedimentation. This property is very important in fracturing operation where proppant such as sand or coated sand are present in the injection fluid to maintain open the fractures, and that allow an efficient recovery of oil and gas.

As used herein, the term "water-soluble polymer" refers to a polymer which gives an aqueous solution substantially without insoluble particles when 10 g/l are appropriately mixed with water at 25° C.

When the term "polymer A" is used in the present invention, it corresponds to the associative water-soluble polymer A. This is the same for the water-soluble polymer B.

"Macromonomer" is defined here as a polymer or oligomer the molecules of which each have one end-group that acts as a monomer molecule, so that each polymer or oligomer molecule contributes only a single monomer unit to a chain of the product polymer.

An "associative polymer" is defined here as a polymer comprising hydrophilic units and hydrophobic units.

The polymer A and the polymer B may be different or identical, but their form is different, polymer A being in water in oil emulsion form, and polymer B being in particles forms (powder, fines, granules, beads). Polymer A is preferably different from polymer B. More precisely, polymer A and polymer B have preferably not the same monomeric composition and/or not the same molecular weight. Polymer A and polymer B are preferably two distinct polymers.

The Composition of the Invention

The specificity of the invention is to combine an inverse emulsion of an associative water soluble-polymer A, and solid particles of a water soluble-polymer B, said polymer B being preferably associative.

According to a first aspect, the invention provides a composition for preparing an injection fluid in oil and gas recovery comprising:

An inverse emulsion of an associative water-soluble polymer A comprising at least one hydrophobic monomer or one hydrophobic macromonomer, Solid particles of a water-soluble polymer B.

In a preferred embodiment, the composition for preparing an injection fluid in oil and gas recovery comprises:

An inverse emulsion of an associative water-soluble polymer A comprising at least one hydrophobic monomer or one hydrophobic macromonomer and acrylamide, Solid particles of an associative water-soluble polymer B comprising at least one hydrophobic monomer or one hydrophobic macromonomer and acrylamide.

The composition is in liquid form even if it contains dispersed solid particles. The composition is therefore easily transportable, dispersible, pumpable, stable to storage, which facilitates its use in oil and gas recovery conditions.

As described above, polymer A and polymer B are preferably different, and they have at least not the same monomeric composition and/or not the same molecular weight. Polymer A and polymer B are preferably two distinct polymers.

The composition is obtained by mixing appropriately the inverse emulsion of polymer A with solid particles of polymer B obtained according to the invention. The mixture is preferably made by dispersing the solid particles in the inverse emulsion. Any appropriate mean can be used to make the mixture such as blender, rotor/stator mixer, batch stirrer, disperser, Polymer Slicing Unit (PSU) such as described in the document U.S. Pat. No. 8,186,871.

Even if not preferred, solid particles of polymer B may also be pre-wetted with an oil similar or different than the one used in the inverse emulsion of polymer A, or in a brine, generally at a concentration from 40% to 80% by weight of solid particles (polymer B) related to the total amount of liquid (pre-wetting liquid) and solid particles (polymer B). The pre-wetting composition contains oil or brine and may contain surfactant(s) and other ingredients.

According to the invention, the solid particles of polymer B remain in solid state in the composition of the invention. In other terms, polymer B is in solid state and dispersed in the composition while polymer A is in the hydrophilic droplets of the water-in-oil emulsion. The polymer B may absorb part or all of the free water of the inverse emulsion (of polymer A) and be pre-swollen but remains in solid state. Solid state includes these pre-wetted and pre-swollen states.

In practice, in oil and gas recovery process, the composition of the invention is mixed with an aqueous medium such as water, sea water or brine to form the injection fluid. When the composition is appropriately mixed with a sufficient amount of aqueous medium, the inverse emulsion is inverted, and the polymer A is rapidly released, whereas the polymer B starts to dissolve more slowly in the aqueous medium, even if pre-swollen.

In the composition of the invention, the mass ratio between the inverse emulsion of polymer A and the solid particles of polymer B is preferably comprised between 1:1 and 10:1, more preferably between 6:1 and 2:1.

In the composition of the invention, the total concentration of polymer A and polymer B is preferably comprised between 30 w % and 80 w %, more preferably between 37 w % and 70 w %, even more preferably between 40 w % and 65 w %, based on the total weight of the composition.

The composition according to the invention may also comprise other components such as natural thickener such as clay, or synthetic thickener, salts, alkaline agent, surfactant such as the one used in the inverse emulsion or others, biocides, corrosion inhibitor, acids, scale inhibitors, clay swelling inhibitor, guar, guar derivatives, carboxymethyl cellulose, crosslinkers such as zirconium, titanate or borate compounds, delayed crosslinkers.

In the present invention, a particular attention is paid to the rheological analysis of the injection fluids in which the composition of the invention is used. The measurement of different rheological parameters is conducted according to the method described below.

1) Flow Curve

Using an Anton Paar MCR302 rheometer equipped with RheoCompass software and a Cone-Plan measurement system (50 mm-2) °, the viscosity as a function of the shear gradient is measured. The normal force is reset after loading and unloading the sample. The shear gradient range can range from 0.001 to 500 s-1 for a temperature of 25° C.

The curve obtained is then modeled by the Carreau-Yasuda equation, allowing to recover the Newtonian viscosity ($\eta 0$ in cps), the relaxation time (t in sec.) And the flow index (n, flow index). The adjustment value "a" being considered equal to 2.

$$\eta = 1 + (\eta_0 - 1) \cdot (1 + (\tau, \dot{\gamma})^a)^{\frac{n-1}{a}}$$

During the measurement of the flow curve, parameter N1 is also recorded. It corresponds to the first difference of the normal stresses and increases as the shear gradient increases in the viscoelastic materials. It is the manifestation of the Weissenberger effect. N1 is equal to 0 for an isotropic fluid at rest and is never negative.

2) Oscillatory Measurement

In order to determine the linearity range of the material, the elastic modulus G' and loss G' are recorded at 1 Hz for deformations ranging from 0.1 to 100%. The response of the device remained linear up to 10% in general.

In order to realize the frequency sweep of the material, G' and G" are measured from 10 to 0.001 Hz for a deformation comprised in the linear domain, generally 1%.

When measurable, the point of intersection between G' and G" is used to determine the viscoelastic relaxation time according to the following formula:

$$\tau_{osc.} = \frac{1}{2\pi \cdot f_{G'=G''}}$$

3) Calculation

In order to discriminate the products between them, it is possible to evaluate these sand suspension performances statically, by the calculation of the sedimentation velocity, and dynamically, by the calculation of λe/v.

a) Calculation of the Sedimentation Rate

The calculation of the sand sedimentation rate in a viscoelastic fluid is described in the literature (without being exhaustive: SPE 187255, SPE16221) and is based on the following formula:

$$v_p = \left(\frac{2^n g \Delta \rho}{9K}\right)^{\frac{1}{n}} \cdot d^{\frac{n+1}{n}}$$

With g: the acceleration of gravity (9.81 m/s²),
Δp: the difference in density between sand and fluid (: 1650 kg/m3),
d: the diameter of the sand particle (0.86 mm/1) example),
K: the consistency index and n: flow index.

Here we forget the phenomena of sticking and wall which can strongly impact the sedimentation rate and we use this parameter to make a classification between the products.

b) Calculation of λe/v

The dimensionless number λe/v is used to determine the capacity of the fluid to suspend sand under shear. This number depends on the following rheological parameters:

$$\lambda_{e/v} = \frac{0.5 \cdot c \cdot \tau_{osc.} \cdot N_1(\dot{\gamma})}{\eta(\dot{\gamma})}$$

With c: constant (: 1).

When the value is greater than 1 the system is dominated by elastic forces ensuring good suspension capabilities.

The composition alpha of the invention when added to an injection fluid A provides a suspensive effect such as the value at 500 s-1 of λe/v of an injection fluid A prepared by mixing 0.5% in weight of a composition alpha of the invention in a API brine, is at least 50% higher, preferably 75% higher, more preferably 100% higher, even more preferably 125% higher, even more preferably 150% higher than the value of λe/v of a injection fluid B prepared by mixing 0.5% in weight of a composition beta in a 7% NaCl brine, wherein said composition beta is the same as composition alpha except that the polymers of composition beta do not comprise hydrophobic monomer unit or hydrophobic macromonomer unit.

Solid Particles of a Water-Soluble Polymer B

According to the invention, the water-soluble polymer B is preferably an associative polymer comprises at least one hydrophobic monomer or at least one hydrophobic macromonomer, and acrylamide.

Hydrophobic monomers are preferably selected from the following lists:
(meth)acrylic acid esters having an alkyl, arylalkyl and/or ethoxylated and/or propoxylated chain; derivatives of (meth)acrylamide having an alkyl, arylalkyl or dialkyl chain and/or ethoxylated and/or propoxylated chain; cationic allyl derivatives having an alkyl, arylalkyl or dialkyl chain and/or ethoxylated and/or propoxylated chain; anionic or cationic hydrophobic (meth)acryloyl derivatives; and anionic or cationic monomers derivatives of (meth)acrylamide bearing a hydrophobic chain. The alkyl groups of these hydrophobic monomers are preferably C6 to C24 alkyl groups. Most preferred monomers are methacrylamido dimethyl amino propyl derivates bromoalkylated with a C8-C16 alkyl chain and the Ethoxylated Behenyl Methacrylate.

n-hexyl (meth)acrylate, n-octyl (meth)acrylate, octyl (meth)acrylamide, lauryl (meth)acrylate, lauryl meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof.

cationic allyl derivatives having the general formula:

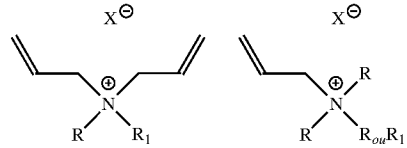

wherein "R ou $R_1$" means "R or $R_1$".
where
R: independently an alkyl chain containing 1 to 4 carbons,
$R_1$: an alkyl or arylalkyl chain comprising 8 to 30 carbons,
X: a halide which may be a bromide, chloride, iodide, fluoride, or any negatively charged counter-ion,
and, preferably, the hydrophobic cationic derivatives of the methacryloyl type having the general formula:

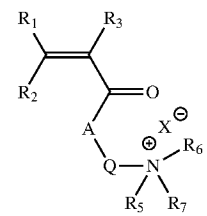

where
A: O or N—$R_4$ (preferably A=N—$R_4$),
$R_1$, $R_2$, $R_3$, $R_4$, $R_5$, $R_6$: independently a hydrogen or an alkyl chain containing 1 to 4 carbons,
Q: an alkyl chain comprising 1 to 8 carbons, R₇: an alkyl or arylalkyl chain comprising 8 to 30 carbons,
X: a halide which may be a bromide, chloride, iodide, fluoride, or any negatively charged counter-ion.

LCST (Lower Critical Solution Temperature) and/or UCST (Upper Critical Solution Temperature) monomers or macromonomers. In other terms, the hydrophobic character may come from the LCST and/or properties of monomers or macromonomers. The non-yet published patent application FR1860204 refers to such macromonomers having LSCT property.

monomers having the general formula

$CH_2=CR_1—COO-(EO)n-(PO)m-R_2$ in which $R_1$ is hydrogen or methyl, n is a number of at least two preferably from 6 to 100 or from 10 to 40, m is a number from zero to 50, preferably from zero to 20, EO is an ethylene oxide group (—$CH_2$—$CH_2$—O—), PO is a propylene oxide group (—$CH_2$—$CH(CH_3)$—O—) and $R_2$ is a C8-C30 alkyl group or a C8-C30-alkaryl group, n preferably being greater than or equal to m and n+m preferably being from 6 to 100 or from 10 to 40.

The concentration of hydrophobic monomers and hydrophobic macromonomers in mol % based on the total monomer and macromonomer content is preferably comprised between 0.0001% and 10%, more preferably between 0.001% and 5%, even more preferably between 0.01% and 3%, even more preferably between 0.1 and 2%, even more preferably between 0.2 and 1.5%, even more preferably 0.3 and 1.3%.

The water-soluble polymer B preferably comprises acrylamide. The concentration of acrylamide based on the total monomer and macromonomer content is preferably comprised between 5 and 99.9999 mol %, more preferably between 10 and 95 mol %, even more preferably between 20 and 90 mol %, even more preferably between 30 and 80 mol %, and more preferably more than 40 mol %, even more preferably more than 50 mol %.

The person skilled in the art will be able to adjust the respective amounts of monomers and macromonomers of polymers B to reach 100 mol %.

Thanks to the specific monomeric composition of solid particles of polymer B, in combination with an inverse emulsion of polymer A, the composition of the invention offers optimal performances in terms of viscosifying effect and suspensive effect.

The polymerization of polymer B is generally a radical polymerization. By radical polymerization, we include radical polymerization by means of UV, azo, redox or thermal initiators as well as controlled radical polymerization (CRP) techniques or Reversible Chain Transfer by addition-Fragmentation (RAFT) polymerization techniques or Macromolecular Design by Interchange of Xanthate (MADIX). According to a very preferred embodiment, polymer B is obtained by RAFT polymerization or CRP or MADIX polymerization techniques.

The water-soluble polymer B is preferably an anionic or an amphoteric polymer.

The water-soluble polymer B may also contain additional monomers such as non-ionic monomers different from acrylamide, and/or anionic monomers, and/or cationic monomers, and/or zwitterionic monomers.

Additional non-ionic monomers are preferably selected from the group comprising methacrylamide; N-mono derivatives of acrylamide; N-mono derivatives of methacrylamide; N,N derivatives of acrylamide; N,N derivatives of methacrylamide; acrylic esters; and methacrylic esters. The most preferred additional non-ionic monomers are N-vinylpyrrolidone and N-vinylformamide.

Additional anionic monomers are preferably selected from the group comprising monomers having a carboxylic function and salts thereof; monomers having a sulfonic acid function and salts thereof; monomers having a phosphonic acid function and salts thereof such as vinylphosphonic acid. They include for instance acrylic acid, methacrylic acid, maleic acid, itaconic acid; salts thereof and hemi esters thereof. The most preferred additional anionic monomers are acrylic acid, and salts thereof. Generally, salts are alkaline salts, alkaline earth salts or ammonium salts. Preferred salts are sodium salts.

Additional cationic monomers are preferably selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC). Dimethylaminoethyl acrylate (DMAEA) quaternized or salified is preferred.

Additional zwitterionic monomer may be a derivative of a vinyl unit, particularly an acrylamide, acrylic, allylic or maleic unit, this monomer having an amine or quaternary ammonium function and a carboxylic acid (or carboxylate), sulphonic acid (or sulphonate) or phosphoric acid (or phosphate or phosphonate). The dimethylaminoethyl acrylate derivatives, such as 2-((2-(acryloyloxy) ethyl) dimethylammonio) ethane-1-sulfonate, may be mentioned in particular and in a non-limiting manner, the 3-((2-(acryloyloxy) ethyl) dimethylammonio) propane-1-sulfonate, 4-((2-(acryloyloxy) ethyl) dimethylammonio) butane-1-sulfonate, [2-(acryloyloxy) ethyl] (dimethylammonio) acetate, methacrylate derivatives of dimethylaminoethyl such as 2-((2-(methacryloyloxy) ethyl) dimethylammonio) ethane-1-sulfonate, 3-((2-(methacryloyloxy) ethyl) dimethylammonio) propane-1-sulfonate, 4-((2-(methacryloyloxy) ethyl) dimethylammonio) butane-1-sulfonate, [2-(methacryloyloxy) ethyl] (dimethylammonio) acetate, dimethylamino propylacrylamide derivatives such as 2-((3-acrylamidopropyl) dimethylammonio) ethane-1-sulfonate, 3-((3-acrylamidopropyl) dimethylammonio) propane-1-sulfonate, 4-((3-acrylamidopropyl) dimethylammonio) butane-1-sulfonate, [3-(acryloyl)oxy) propyl] (dimethylammonio) acetate, dimethylamino propyl methylacrylamide derivatives such as 2-((3-methacrylamidopropyl) dimethylammonio) ethane-1-sulfonate, 3-((3-methacrylamidopropyl) dimethylammonio) propane-1-sulfonate 4-((3-methacrylamidopropyl) dimethylammonio) butane-1-sulfonate and [3-(methacryloyloxy) propyl] (dimethylammonio) acetate.

In a preferred embodiment, the polymer B comprises at least one hydrophobic monomer or one hydrophobic macromonomer, acrylamide, and further comprises acrylamide tertiary butyl sulfonic acid (ATBS), and/or salts thereof. ATBS concentration in weight based on the total monomer and macromonomer content is preferably comprised between 1 and 40 mol %, more preferably between 1 and 15 mol %, even more preferably between 2 and 12 mol %, even more preferably between 3 and 10 mol %, even more preferably between 4 and 8 mol %.

The person skilled in the art will be able to adjust the respective amounts of monomers and macromonomers of polymers B to reach 100 mol %.

In a preferred embodiment, acrylamide tertiary butyl sulfonic acid (ATBS) is the ATBS monohydrate described in the document WO 2018/172676. The use of ATBS monohydrate is particularly useful to reach the best performances in terms of viscosifying effect and suspensive effect. As specified in WO 2018/172676, the ATBS monohydrate is the hydrated crystalline form of ATBS having the following X-Ray powder diffraction peaks: 10.58°, 11.2°, 12.65°, 13.66°, 16.28°, 18.45°, 20°, 20.4°, 22.5°, 25.5°, 25.88°, 26.47°, 28.52°, 30.28°, 30.8°, 34.09°, 38.19°, 40.69°, 41.82°, 43.74°, 46.04° degrees 2-thêta (+/−0.1°).

In another preferred embodiment, a post-treatment step is applied on polymer B.

The post-treatment step consists in reacting hydrolysable function such as amide with a hydrolysis agent. This hydrolysis agent may be an enzyme, an ion exchange resin, or an alkali metal, preferably, it is a Brønsted base.

After the post-treatment step, carboxylate group or carboxylic acid moieties are created. Indeed, the reaction between hydrolysis agent and the hydrolysable function such as amide results in the formation of a carboxylate or carboxylic acid moieties.

Carboxylate bearing polyacrylamides may be obtained according to different processes. Among them, one process is to polymerize acrylamide which has been partially or totally pre-hydrolyzed before the polymerization with caustic soda or an enzyme such as an amidase. Another process is to copolymerize acrylamide and acrylic acid and/or salt thereof. Another process is to add a hydrolyzing agent before, at the start and/or during the polymerization, wherein said addition is either made on the concentrated or diluted solution, on the emulsion, dewatered emulsion, or on the gelatinous substance. Another process is to add a hydrolyzing agent after the polymerization, wherein said addition is either made in concentrated or diluted media. The polymerization can be solution polymerization, emulsion polymerization, dispersion polymerization, or gel polymerization. The post-treatment step can be made on the finished polymer or the polymer can be dissolved at a pumpable concentration in a solvent at typically at 1 to 6% of polymer concentration.

All the above techniques have advantages and drawbacks related to waste gas production, molecular weight, heat release, process of production.

In a very preferred embodiment, polymer B is obtained according to a process that comprises successively:
Providing an aqueous solution of monomers comprising at least one hydrophobic monomer or at least one hydrophobic macromonomer, and preferably acrylamide;
Polymerizing said aqueous solution of monomers to obtain a gel of polymer;
Cutting said gel in pieces, preferably of less than 10 cm$^3$, more preferably less than 5 cm$^3$, more preferably less than 1 cm$^3$;
Carrying out a post-treatment step by mixing a hydrolyzing agent on said pieces of gel;
Obtaining treated pieces of gel of polymer B at the end of the post-treatment step;
Drying said treated pieces of gel;
Obtaining a powder of polymer B;
Optionally grinding said powder;
Optionally sieving said powder.

The rate of conversion is the number of hydrolysable functions, such as an amide, in mol % which are converted in carboxylate or carboxylic acid moieties, as compared to the total amount of mole of monomeric units and macromonomeric units in the polymer before the post-treatment (including hydrolysable and non-hydrolysable monomeric units).

In a preferred embodiment, the rate of conversion is at least 5 mol %, preferably at least mol %. The maximum rate of conversion depends of parameters such as the content of monomers having a hydrolysable function, the number of hydrolysable functions on each monomer, and the total carboxylate functions content in the polymer. Generally, the maximum rate of conversion is 40 mol %, preferably 30 mol %. The preferred rate of conversion is comprised between 10 and 25 mol %.

According to a preferred embodiment, the hydrolysable function in the polymer B before the post-treatment step is an amide from acrylamide monomer, and the post-treatment step converts the amide into carboxylate or carboxylic acid group. More preferably, the amide function of the acrylamide monomer units is converted into carboxylate salt and/or carboxylic acid moieties.

For example, if the polymer before the post-treatment is obtained by polymerization of 90 mol % of acrylamide, 9 mol % of acrylamide tertiary butyl sulfonic acid (ATBS), and/or salts thereof, and 1 mol % of a hydrophobic monomer, that the post treatment step is made with caustic soda, and that the rate of conversion is 15 mol %, the obtained polymer B composition is 75 mol % of acrylamide, 15 mol % of sodium carboxylate moieties, 9 mol % of acrylamide tertiary butyl sulfonic acid (ATBS), and/or salts thereof, and 1 mol % of the hydrophobic monomer.

The polymer B comprises preferably between 10 and 40 mol %, more preferably between 15 and 30 mol % of carboxylate or carboxylic acid moieties. Monomer units comprising carboxylate or carboxylic acid group may therefore come from the use of monomers in the polymerization step (for instance an additional monomer such as acrylic acid) and the conversion of hydrolysable functions during the post-treatment step.

The rate of conversion relates to functions converted to carboxylate or carboxylic acid moieties during the post-treatment step. It does not include carboxylate and carboxylic acid moieties that do not result from the post-treatment step. For instance, when a polymer is prepared by polymerization of acrylamide, ATBS and acrylic acid, the rate of conversion does not include the carboxylic acid group of acrylic acid.

In a preferred embodiment, more than 50 mol % of the monomer units comprising carboxylate or carboxylic acid moieties, preferably more than 70 mol %, even more preferably more than 90 mol %, even more preferably all the carboxylate or carboxylic acid moieties are the result of the conversion of hydrolysable functions during the post treatment step.

Polymer B is preferably a polymer comprising 30 to 87 mol %, preferably 50 to 87 mol %, of acrylamide, from 0.0001 to 3 mol % of at least one hydrophobic monomer and/or at least one hydrophobic macromonomer, from 2 to 12 mol %, preferably from 3 to 10 mol %, more preferably from 4 to 8 mol %, of acrylamide tertiary butyl sulfonic acid (ATBS) and/or salt(s) thereof, optionally from 10 to 40 mol %, preferably from 10 to 30 mol %, more preferably from 10 to 25 mol % of monomer units comprising carboxylate or carboxylic acid moieties, and wherein all the monomeric units comprising carboxylate or carboxylic acid moieties are preferably the result of the conversion of hydrolysable functions during the post-treatment step.

In a specific embodiment of the invention, polymer B is preferably a polymer comprising 30 to 87 mol %, preferably 50 to 87 mol %, of acrylamide, from 0.0001 to 3 mol % of at least one hydrophobic monomer and/or at least one hydrophobic macromonomer, from 2 to 12 mol %, preferably from 3 to 10 mol %, more preferably from 4 to 8 mol %, of acrylamide tertiary butyl sulfonic acid (ATBS) and/or salt(s) thereof, optionally from 10 to 40 mol %, preferably from 10 to 30 mol %, more preferably from 10 to 25 mol % of monomer units comprising carboxylate or carboxylic acid moieties, and wherein all the monomer units comprising carboxylate or carboxylic acid moieties are preferably the result of the conversion of hydrolysable functions during the post-treatment step, wherein polymer B only contain acrylamide monomer units, ATBS monomer units, and monomer units comprising carboxylate or carboxylic acid moieties.

In a specific and preferred embodiment, polymer B is an amphoteric polymer that further comprises preferably between 0.1 and 5 mol %, more preferably between 0.5 and 3 mol % of cationic monomer. Preferred cationic monomer are dimethylaminoethyl (meth)acrylate chloromethylated, diallyldimethyl ammonium chloride; (meth)acrylamidopropyltrimethylammonium chloride. In this embodiment, polymer B is preferably a polymer comprising 25 to 84 mol %, preferably 45 to 84 mol %, of acrylamide, from 0.0001 to 3 mol % of at least one hydrophobic monomer and/or at least one hydrophobic macromonomer, from 2 to 12 mol %, preferably from 3 to 10 mol %, more preferably from 4 to 8 mol %, of acrylamide tertiary butyl sulfonic acid (ATBS) and/or salt(s) thereof, from 0.1 to 5 mol %, preferably from 0.5 to 3 mol % of cationic monomer, optionally from 10 to mol %, preferably from 10 to 30 mol %, more preferably from 10 to 25 mol % of monomer units comprising carboxylate or carboxylic acid moieties, and wherein all the monomer units comprising carboxylate or carboxylic acid moieties are preferably the result of the conversion of hydrolysable functions during the post-treatment step.

The person skilled in the art will be able to adjust the respective amounts of monomers and macromonomers of polymers B to reach 100 mol %.

It is also possible to use a branching agent. Such an agent is, for example, chosen from methylenebisacrylamide (MBA), ethylene glycol diacrylate, tetraallyl ammonium chloride polyethylene glycol dimethacrylate, diacrylamide, cyanomethyl acrylate, vinyloxyethyl acrylate, vinyloxy methacrylate, triallylamine, formaldehyde, glyoxal, glycidyl ethers such as ethylene glycol diglycidyl ether, and epoxies, and mixtures thereof. When using such branching agent, the quantity used is such that polymer B remains a water-soluble polymer. Those skilled in the art will adjust, in a known manner, the amounts of branching agent.

It is also possible to use a free radical chain transfer agent, otherwise known as a chain limiter. The use of a transfer chain agent is particularly advantageous for controlling the molecular weight of the polymer obtained. By way of example of a transfer agent, reference may be made to methanol, isopropanol, sodium hypophosphite, 2-mercaptoethanol and sodium methallyl sulfonate, and mixtures thereof. Those skilled in the art will adjust, in a known manner, the amounts of the transfer agent.

According to the invention, the water-soluble polymer B may have a structure which is a linear, branched, star, comb, block, or microblock structure or a controlled polydispersity in terms of molecular weight. These properties can be obtained by selecting the initiator, the transfer agent, the polymerization technique such as the template polymerization, controlled radical polymerizations known as RAFT (reversible chain transfer by addition-fragmentation), NMP (Nitroxide Mediated Polymerization) or ATRP (Atom Transfer Radical Polymerization) or MADIX type polymerization, the incorporation of structural monomers, and/or the concentration. The general knowledge of the skilled person allows him or her to prepare a water-soluble polymer having one of these types of structure. Polymer B according to the invention, whatever its morphology, remains water soluble.

According to the invention, the solid particles of the water-soluble polymer B may be in the form of powder, fines, granules or beads. They may be spherical or not.

In a preferred embodiment, the particles of polymer B are of fine particle size and are called fines. Fines are preferably obtained by sieving and/or grinding the powder obtained by gel polymerization process above described after drying. Before mixing them with the inverse emulsion of polymer A, the fines of polymer B have preferably a particle size distribution, represented by the D50 value, comprised between 5 µm and 500 µm, more preferably between 50 µm and 400 µm, even more preferably between 100 µm and 350 µm. The selection of fines is particularly useful to reach optimal performances in terms of viscosifying effect and suspensive effect in the injection fluid.

There are a number of methods used to monitor particle size distribution. The most popular methods include sieve analysis, direct imaging and laser diffraction. Historically, particle size distributions were calculated based on results from sieve analysis. Sieve analysis presents particle size information in the form of an S-curve of cumulative mass retained on each sieve versus the sieve mesh size. The most commonly used metrics when describing particle size distributions are D-Values (D10, D50 & D90) which are the intercepts for 10%, 50% and 90% of the cumulative mass.

D-values can be thought of as the diameter of the sphere which divides the sample's mass into a specified percentage when the particles are arranged on an ascending mass basis. For example, the D10 is the diameter at which 10% of the sample's mass is comprised of particles with a diameter less than this value. The D50 is the diameter of the particle that 50% of a sample's mass is smaller than and 50% of a sample's mass is larger than.

The particles of polymer B may absorb part or all of the free water of the inverse emulsion and be pre-swollen but remaining solid. The size of the particles in the composition tends to grow due to the water absorption. The size of particles of polymer B in the composition is preferably comprised between 10 µm and 1500 µm, more preferably between 80 µm and 1000 µm, even more preferably between 150 µm and 800 µm.

The water-soluble polymer B according to the invention has preferably an average molecular weight by weight comprised between 1 million g/mol and 50 million g/mol, more preferably higher than 10 million g/mol, more preferably higher that 15 million g/mol, even more preferably higher than 20 million g/mol.

The "weight average molecular weight" according to the present invention is determined by the intrinsic viscosity. The intrinsic viscosity can be measured by methods known to the skilled person and especially can be calculated from the values of reduced viscosity for different concentrations by a graphical method consisting of plotting the reduced viscosity values (on the ordinate axis) against the concentrations (on the abscissa axis) and extrapolating the curve to zero concentration. The intrinsic viscosity value is read off the ordinate axis or by using least square method. Then the weight average molecular weight can be determined by the well-known Mark-Houwink equation:

$$[\eta] = K M^{\alpha}$$

[$\eta$] represents intrinsic viscosity of the polymer determined by solution viscosity measuring method, K represents an empiric constant, M represents molecular weight of the polymer, α represents the Mark-Houwink coefficient α and K, depend on the particular polymer-solvent system

Inverse Emulsion of an Associative Water-Soluble Polymer A

According to the invention, the water-soluble polymer A comprises at least one hydrophobic monomer or at least one hydrophobic macromonomer, and preferably acrylamide.

The hydrophobic monomer or the hydrophobic macromonomer are preferably selected according to the lists and preferences mentioned above regarding polymer B.

The concentration of hydrophobic monomers and hydrophobic macromonomers in mol % based on the total monomer and macromonomer content is preferably comprised between 0.0001% and 10%, more preferably between 0.001% and 5%, even more preferably between 0.01% and 3%, even more preferably between 0.1 and 2%, even more preferably between 0.2 and 1.5%, even more preferably 0.3 and 1.3%.

The water-soluble polymer A preferably comprises acrylamide. The concentration of acrylamide based on the total monomer and macromonomer content is preferably comprised between 5 and 99.9999 mol %, more preferably between 10 and 95 mol %, even more preferably between 20 and 90 mol %, even more preferably between 30 and 80 mol %, and more preferably more than 40 mol %, even more preferably more than 50 mol %.

The person skilled in the art will be able to adjust the respective amounts of monomers and macromonomers of polymers A to reach 100 mol %.

Thanks to the specific monomeric composition of polymer A in inverse emulsion form, in combination with the solid particles of polymer B, the composition of the invention offers optimal performances in terms of viscosifying effect and suspensive effect.

The polymerization of polymer A is generally a radical polymerization. By radical polymerization, we include radical polymerization by means of UV, azo, redox or thermal initiators as well as controlled radical polymerization (CRP) techniques or Reversible Chain Transfer by addition-Fragmentation (RAFT) or MADIX polymerization techniques. According to a very preferred embodiment, polymer A is obtained by RAFT polymerization or CRP or MADIX polymerization techniques.

The water-soluble polymer A may also contain additional monomers such as non-ionic monomer different from acrylamide, and/or anionic monomers, and/or cationic monomers, and/or zwitterionic monomers. Said monomers are preferably selected according to the lists and preferences mentioned above regarding polymer B.

An inverse emulsion, otherwise known as a water-in-oil emulsion, is composed of an oily phase, generally a lipophilic solvent or an oil, which constitutes the continuous phase, in which water droplets comprising a polymer are in suspension, these water droplets forming a dispersed phase. An emulsifying surfactant (called a water-in-oil surfactant) which is placed at the water/oil interface stabilizes the dispersed phase (water+polymer) in the continuous phase (lipophilic solvent or oil).

The inverse emulsion of water-soluble polymer A can be prepared according to any process known by the person skilled in the art. Generally, an aqueous solution comprising the monomer(s) is emulsified in an oil phase comprising at least one emulsifying agent(s). Then, the polymerization is made by the addition of a free radical initiator. Reference may be made to redox couples, comprising cumene hydroperoxide, tertiary butylhydroxyperoxide or persulfates among the oxidizing agents, sodium sulfite, sodium metabisulfite and the Mohr salt among the reducing agents. Azo compounds such as 2,2'-azobis (isobutyronitrile) and 2,2'-azobis (2-amidinopropane) hydrochloride can also be used.

The inverse emulsion of water-soluble A is preferably prepared according to the process comprising the following steps:

a) Preparing an aqueous phase comprising at least one hydrophobic monomer or at least one hydrophobic macromonomer and optionally other water-soluble monomers, b) Preparing an oily phase comprising at least one oil and at least one water-in-oil surfactant, c) Mixing the aqueous phase and the oily phase to form a water in oil emulsion, d) Once the water in oil emulsion is formed, polymerizing under substantially oxygen free conditions the monomers of the aqueous phase with at least one free radical polymerization initiator system.

e) At the end of the polymerization, obtaining an inverse emulsion of polymer, f) Optionally, and preferably distillate said inverse emulsion;

g) Optionally, performing a post treatment on the polymer of said inverse emulsion.

Optional step f) may be carried out before or after step g). Preferably step f) is carried out after step g). Mixing step c) is preferably conducted under high shear.

First Specific and Preferred Embodiment of the Inverse Emulsion of the Associative Water-Soluble Polymer A According to a first specific and preferred embodiment, the inverse emulsion of water-soluble A is obtained by polymerization carried out partially or totally at a pressure preferably comprised between 0.1 and 200 mbar (1 bar=$10^5$ Pa), more preferably between 5 and 150 mbar, even more preferably between 20 and 100 mbar.

Even if the composition of the invention already offers superior viscosifying and suspensive effect compare to the composition of the prior art, the polymerization at a certain level of vacuum of the inverse emulsion further improves the performances in terms of viscosifying effect and suspensive effect.

According to the specific and preferred embodiment, when the polymerization of the inverse emulsion of water-soluble polymer A is carried out partially at a pressure of less than 200 mbar, the duration of this polymerization at reduced pressure represents preferably at least 10% of the overall duration of the polymerization, preferably at least 30%, more preferably more than 50%, even more preferably more than 80%. In a preferred embodiment, the polymerization is fully conducted at a pressure of less than 200 mbar.

The polymerization is preferably conducted batch wise. In an industrial perspective it is preferable to produce large batch, but it is generally difficult to increase the batch volume. It has been found that the volume of batch polymerization can be more than 10 m³, preferably higher than 20 m³, and more preferably higher than 40 m³, when the polymerization is carried out at a pressure of less than 200 mbar When the polymerization is carried out partially or totally at a pressure from 0.1 to 200 mbar, in practice, steps a), b), and c) are carried out at atmospheric pressure, and the pressure is lowered to a value at least below 200 mbar throughout all or part of the duration of the polymerization, preferably during all the polymerization. Additional steps of degassing with nitrogen and of increasing to the reaction temperature may be added to the steps described previously.

At the end of the polymerization, the reactor is reset to atmospheric pressure to discharge the water in oil emulsion. It is also possible to maintain a pressure below 200 mbar during step a, and/or b) and/or c), and/or during the discharge and/or during the storage of the inverse emulsion.

The means for lowering the pressure are all known means, without this being limited. Examples that may be mentioned include positive displacement pumps such as liquid ring pumps or diaphragm pumps, momentum transfer pumps, regenerative pumps, entrapment pumps, steam ejectors.

The polymerization is preferably carried out in a reactor capable of maintaining a low pressure which is preferable for the process. A condenser may also be advantageously used to remove water and/or a mix of volatiles or oil from the exhaust gas pulled from the emulsion during polymerization under low pressure or vacuum.

The polymerization is generally initiated after depressurizing the reactor but may also be initiated before or during the pressure reduction step. The depressurization step generally lasts a few seconds, or even a few minutes, depending on the volume of the reactor, and depending on the equipment used to achieve the vacuum.

According to one particular embodiment, the following are thus successively performed:
steps a), b) and c) are made at atmospheric pressure, and include nitrogen sparging,
the pressure is lowered,
the polymerization of step d) is initiated.

In another embodiment, the following are successively performed:
steps a), b) and c) are made at atmospheric pressure, and include nitrogen sparging,
simultaneously, the pressure is lowered, and the polymerization is initiated.

In another embodiment, the following are successively performed:
steps a), b) and c) are made at atmospheric pressure, and include nitrogen sparging,
the polymerization is initiated,
the pressure is lowered during the polymerization.

In a preferred embodiment, the exhaust gas formed during polymerization under vacuum and consisting of a mix of water and oil is not returned to the polymerization mass but condensed using a condenser and removed from polymer A.

Second Specific and Preferred Embodiment of the Inverse Emulsion of the Associative Water-Soluble Polymer A The water-soluble polymer A preferably comprises at least acrylamide monomer units and at least acrylamide tertiary butyl sulfonic acid (ATBS), and/or salts thereof, preferably in an amount of 1 to 15 mol %. The polymer A may optionally further comprise at least one non-ionic monomer different from acrylamide, and/or at least one anionic monomer different from ATBS, and/or at least one cationic monomer, and/or at least one zwitterionic monomer.

The amount of acrylamide tertiary butyl sulfonic acid (ATBS) and/or its salts in polymer A is preferably comprised between 2 and 12 mol %, more preferably between 3 and 10 mol %, even more preferably between 4 and 8 mol %. The expression mol % means the percentage in mole compare to the total amount of mole of monomers and macromonomers.

In a preferred embodiment, acrylamide tertiary butyl sulfonic acid (ATBS) is the ATBS monohydrate described in the document WO 2018/172676. The use of ATBS monohydrate is particularly useful to reach the best performances in terms of viscosifying effect and suspensive effect.

Third Specific and Preferred Embodiment of the Inverse Emulsion of Associative Water-Soluble Polymer A In a preferred embodiment, a post-treatment step as described above is performed on the inverse emulsion of polymer obtained at the end of the polymerization step (which would be for example step e)), that improves the performances in terms of viscosifying effect and suspensive effect. The post treatment is conducted such as described above for polymer B, and the same preferences are applied thereto.

Fourth Specific and Preferred Embodiment of the Inverse Emulsion of the Associative Water-Soluble Polymer A In a preferred embodiment, the inverse emulsion of polymer A is distilled. After the polymerization in inverse emulsion of polymer A, a subsequent step is carried out which consists in distilling the obtained inverse emulsion to convert the inverse emulsion in a dewatered inverse emulsion (DW inverse emulsion).

In order to convert the inverse emulsion obtained to the DW inverse emulsion, after the polymerization, some or all of the water is distilled off from the emulsion thus yielding particles of polymer A dispersed in the oil phase.

Beyond the known advantages of said DW inverse emulsion (economically viable delivery form, low water content), it has been found that said DW inverse emulsion of polymer A, when combined to particles of polymer B according to the invention, leads to a composition that offers optimal performances in terms of suspensive effect.

For the DW inverse emulsion, the water is removed to a level of less than about 15%, or less than about 12%, or less than about 10%, or less than about 8%, or less than about 5% by weight. In embodiments, the removal of water along with some oil is carried out by any suitable means, for example, at reduced pressure, e.g. at a pressure of about 0.001 to about 0.5 bars, or about 0.05 to about 0.25 bars. The temperature for water removal steps may typically be from about 50° C. to about 150° C., although techniques which lead to the removal of water at higher temperatures may be used. In certain embodiments, one or more of the hydrophobic liquids used in the inverse emulsion are low boiling liquid(s), which can be distilled off together with water as a mixture. Batch distillation and continuous distillation may be used to produce the DW inverse emulsion, continuous distillation on thin film or wiped film evaporators being preferred.

Before or after removal of the desired amount of water, one or more inverting surfactants, and other optional components such as polymeric stabilizers, may be added.

In this preferred embodiment, the distillation step is carried out such as the concentration of polymer A in the DW inverse emulsion is preferably comprised between 44 and 60% by weight, more preferably between 51 and 58% by weight.

General Description of the Inverse Emulsion of the Associative Water-Soluble Polymer A The associative water-soluble polymer A is preferably a polymer comprising acrylamide, at least one hydrophobic monomer or at least one hydrophobic macromonomer. Polymer A, optionally and preferably comprises acrylamide tertiary butyl sulfonic acid (ATBS) and/or salt(s) thereof, and optionally and preferably acrylic acid and/or salt(s) thereof that may also comprise additional monomers such as non-ionic monomers different from acrylamide, and/or anionic monomers different from ATBS, and/or cationic monomers, and/or zwitterionic monomers.

Water-soluble polymer A is more preferably a polymer of acrylamide and acrylamide tertiary butyl sulfonic acid (ATBS) and/or salt(s) thereof, and acrylic acid and/or salt(s)

thereof, that also comprise at least one hydrophobic monomer or at least one hydrophobic macromonomer. Polymer A is preferably a polymer comprising 30 to 87 mol %, preferably 50 to 87 mol %, of acrylamide, from 0.0001 to 3 mol % of at least one hydrophobic monomer and/or at least one hydrophobic macromonomer, from 2 to 12 mol %, preferably from 3 to 10 mol %, more preferably from 4 to 8 mol %, of acrylamide tertiary butyl sulfonic acid (ATBS) and/or salt(s) thereof, and optionally from 10 to 40 mol %, preferably from 10 to 30 mol %, more preferably from 10 to 25 mol % of acrylic acid and/or salt(s) thereof.

The person skilled in the art will be able to adjust the respective amounts of monomers and macromonomers of polymer A to reach 100 mol %.

Polymer A comprises preferably between 10 and 40 mol %, more preferably between 15 and mol % of carboxylate or carboxylic acid moieties. Carboxylate or carboxylic acid moieties may come from the use of monomers in the polymerization step and/or the conversion of hydrolysable functions during the post-treatment step.

The water-soluble polymer A is preferably an anionic or an amphoteric polymer.

In a preferred embodiment, polymer A is an amphoteric polymer that further comprises preferably between 0.1 and 5 mol %, more preferably between 0.5 and 3 mol % of cationic monomer.

Generally, at least one inverting agent is added at the end of the polymerization reaction, preferably at a temperature below 50° C.

At the end of polymerization, and before any distillation, the inverse emulsion of water-soluble A comprises preferably from 10% to 60% by weight of water-soluble polymer A, preferably from 25 to 60%, more preferably from 28 to 45% by weight, even more preferably 28 to 40% by weight, even more preferably from 32 to 40% by weight, even more preferably from 34 to 40% by weight.

Conventionally, the polymerization is generally carried out isothermally, adiabatically or at controlled temperature. That is to say the temperature is kept constant, generally between 1° and 60° C. (isotherm), or else the temperature is left to increase naturally (adiabatic) and in this case the reaction is generally begun at a temperature below 10° C. and the final temperature is generally above 50° C., or, finally, the temperature increase is controlled so as to have a temperature curve between the isotherm curve and the adiabatic curve.

The initial temperature of polymerization is preferably comprised between 0.1 and 40° C., more preferably between 1° and 30° C. The final polymerization temperature is preferably comprised between 20° C. and 90° C., more preferably between 35° C. and 70° C.

The duration of polymerization is preferably less than 24 hours, more preferably less than hours, even more preferably less than 8 hours.

The same additional monomers, branching agent, free radical chain transfer agent as described above may be used to obtain polymer A.

According to the invention, water-soluble polymer A may have a structure which is a linear branched, star, comb, block, or microblock structure or a controlled polydispersity in molecular weight. These properties can be obtained by selecting the initiator, the transfer agent, the polymerization technique such as the template polymerization, the controlled radical polymerization known as RAFT (reversible chain transfer by addition-fragmentation), NMP (Nitroxide Mediated Polymerization) or ATRP (Atom Transfer Radical Polymerization) or MADIX type polymerization, the incorporation of structural monomers and/or the concentration. The general knowledge of the skilled person allows him or her to prepare a water-soluble polymer having one of these types of structure. Polymer A according to the invention, whatever its specific morphology, remains water soluble.

The water-soluble polymer A according to the invention has preferably an average molecular weight by weight comprised between 1 million g/mol and 50 million g/mol, more preferably higher than 10 million g/mol, more preferably higher that 15 million g/mol, even more preferably higher than 20 million g/mol.

The oil used to prepare the inverse emulsion of the invention may be a mineral oil, a vegetal oil, a synthetic oil or a mixture of several of these oils. Examples of mineral oil are mineral oil containing saturated hydrocarbons of aliphatic, naphtenic, paraffinic, isoparaffinic, cycloparaffinic or naphthyl type. Example of synthetic oil are hydrogenated polydecene or hydrogenated polyisobutene; an ester such as octyl stearate or butyl oleate. Exxsol® products range from Exxon are suitable oil.

In general, the weight ratio of the aqueous phase to the oil phase during the polymerization is preferably from 50/50 to 90/10, more preferably 70/30 to 80/20.

The inverse emulsion of polymer A preferably comprises from 10 to 50% by weight of oil, more preferably from 15 to 45% by weight.

The inverse emulsion of polymer A preferably comprises from 5 to 55% by weight of water, more preferably from 5 to 35% by weight.

The inverting agent is a surfactant generally having a HLB value greater than 10. By way of example of such inverting agent, reference may be made to ethoxylated sorbitan esters such as sorbitan oleate ethoxylated with 20 equivalents of ethylene oxide (EO 20), sorbitan laurate polyethoxylated with 20 mol of ethylene oxide, castor oil polyethoxylated with 40 mol of ethylene oxide, decaethoxylated oleodecyl alcohol, heptaethoxylated lauryl alcohol, or sorbitan monostearate polyethoxylated with 20 mol of ethylene oxide. Inverting agent may also be polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with ethylene oxide units; condensation products of alkylphenols and ethylene oxide, such as the reaction products of isooctylphenol with 12 ethylene oxide units; condensation products of higher fatty acid amines with five, or more, ethylene oxide units; ethyleneoxide tristerylphenol; ethylene oxide condensation products of polyhydric alcohol partial higher fatty esters, and their inner anhydrides (e.g., mannitol anhydride, and sorbitol-anhydride); amine oxide; an alkyl polyglucoside; a glucamide; an ester phosphate or an alkylbenzene sulfonic acid salt; hydrosoluble polymeric surfactant.

In a preferred embodiment, the inverting agent is a ethoxylated nonylphenol, preferably having 4 to 10 ethoxylation, an ethoxy/propoxy alcohol, preferably having C12 to C25 ethoxy/propoxylation, or a tridecylic alcohol ethoxylated, or an ethoxy/propoxy fatty alcohol.

The inverse emulsion of polymer A may contain at least two inverting agents, preferably at least three inverting agents, even more preferably at least four inverting agents.

The emulsifying agent is a surfactant generally having a HLB value inferior to 10. By way of example of such emulsifying agent, reference may be made to surfactant polymers such as polyesters having a molecular weight of between 1000 and 3000, products of condensation between a poly (isobutenyl) succinic acid or the anhydride thereof and a polyethylene glycol, block copolymers having a molecular weight of between 2500 and 3500, for example those sold under the Hypermer® names, sorbitan extracts, for instance sorbitan monooleate, sorbitan isostearate or sorbitan sesquioleate, polyethoxylated sorbitan esters, or else diethoxylated oleocetyl alcohol or tetraethoxylated lauryl acrylate, condensation products of higher fatty alcohols with ethylene oxide, such as the reaction product of oleyl alcohol with 2 ethylene oxide units; condensation products of alkylphenols and ethylene oxide, such as the reaction product of nonyl phenol with 4 ethylene oxide units. Products like Witcamide® 511, betaine products and ethoxylated amine are also good candidates as emulsifying agents.

In a preferred embodiment, the emulsifying agent is a sorbitan monoleate, polyethoxylated sorbitan esters or tall oil fatty acid diethanolamide.

The inverse emulsion of polymer A may contain at least two emulsifying agents, preferably at least three emulsifying agents, even more preferably at least four emulsifying agents.

At the end of the polymerization reaction, it is also possible that the obtained inverse emulsion be diluted or concentrated. A dilution is generally made by adding water or salted water in the water in oil emulsion. It is also possible to concentrate the obtained emulsion, for instance by distillation.

The inverse emulsion of polymer A preferably comprises from 0.8 to 6% by weight, more preferably from 0.8 to 3% w of at least one emulsifying agent.

The inverse emulsion of polymer A preferably comprises from 1 to 12% by weight, more preferably from 2 to 8% w of at least one inverting agent.

The inverse emulsion of polymer A may comprise from 1 to 17% by weight of salts.

Salts present in the inverse emulsion may be for example sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts and mixtures thereof. These salts include sodium chloride, sodium sulfate, sodium bromide, calcium chloride, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate and mixtures thereof. Sodium chloride, calcium chloride ammonium chloride, ammonium sulfate are preferred, and mixtures thereof are further preferred.

In a very preferred embodiment of the invention, the water in oil emulsion of water-soluble polymer A comprises:
from 28 to 58% by weight of water-soluble polymer A;
from 0.8 to 3% by weight of at least one emulsifying agent, preferably of at least two emulsifying agents;
from 2 to 8% by weight of at least one inverting agent, preferably of at least two inverting agents;
from 10 to 50% by weight, preferably from 15 to 45% by weight of oil;
from 5 to 55% by weight, preferably from 5 to 35% by weight of water;
from 0 to 17% by weight of salts, preferably any one or more of sodium chloride, ammonium chloride and ammonium sulfate;
the total amount being 100% by weight;
wherein the water-soluble polymer A is a polymer comprising 30 to 87 mol %, preferably from 50 to 87 mol %, of acrylamide, from 0.0001 to 3 mol % of at least one hydrophobic monomer and/or at least one hydrophobic macromonomer, from 2 to 12 mol % of acrylamide tertiary butyl sulfonic acid (ATBS) and/or salt(s) thereof, optionally from 10 to 40 mol % of carboxylate or carboxylic moieties, preferably acrylic acid and/or salt(s) thereof, wherein the total amount of monomer and macromonomer is 100 mol %, and wherein the inverse emulsion of water-soluble A is obtained by polymerization carried out partially or totally at a pressure preferably comprised between 0.1 and 200 mbar.

Injection Fluid and Method of Treating a Portion of Subterranean Formation

The composition of the invention offers an improved suspensive effect, which is less sensible to shear conditions. The composition of the invention also improves the efficiency at same dosage or keep the same efficiency at lower dosage. This is particularly interesting in fracturing operation, especially when High Viscosity Friction Reducers (HVFR) are used because the dosage of HVFR is generally important.

The composition has also the advantage of being in liquid form and thus easily transportable, dispersible, pumpable, storable, which facilitates its use in oil and gas recovery conditions.

The composition alpha of the invention when added to an injection fluid A provides a suspensive effect such as the value at 500 s-1 of $\lambda e/v$ of an injection fluid A prepared by mixing 0.5% in weight of a composition alpha of the invention in a API brine, is at least 50% higher, preferably 75% higher, more preferably 100% higher, even more preferably 125% higher, even more preferably 150% higher than the value of $\lambda e/v$ of a injection fluid B prepared by mixing 0.5% in weight of a composition beta in a 7% NaCl brine, wherein said composition beta is the same as composition alpha except that the polymers of composition beta do not comprise hydrophobic monomer unit or hydrophobic macromonomer unit.

In a second aspect, the invention provides an injection fluid for oil and gas recovery process, said fluid being prepared with the composition of the invention. The injection fluid may be a polymer flooding injection fluid or a fracturing fluid.

In the method of the invention, the injection fluid is generally made by mixing the composition of the invention with an aqueous medium such as water, sea water or brine. When the composition is mixed with a sufficient amount of aqueous medium, the inverse emulsion is inverted, and the polymer A is rapidly released, whereas the polymer B starts to dissolve slower in the aqueous medium, even if preswollen.

The injection fluid comprises the water-soluble polymers A and B in a total amount of preferably from 0.0005% by weight to 3% by weight, more preferably from 0.02% w to 2% w, even more preferably from 0.05% w to 1% w, even more preferably from 0.5% w to 1% w. The amount of water-soluble polymers A and B varies depending of the oil and gas recovery process, the conditions in the subterranean formation (for example salinity and/or temperature), and the desired results.

The injection fluid may also comprise other components such as proppants (such as sand, coated sand, ceramic beads), alkaline agents, surfactants, complex nanofluid, microemulsions biocides, corrosion inhibitors, acids, scale inhibitors, clay swelling inhibitors, guar, guar derivatives, carboxy methyl cellulose derivatives, crosslinkers such as zirconium, titanate or borate compounds, delayed crosslinker, breakers, encapsulated breakers, preformed particle gels, nanogels, colloidal dispersion gels, clays, bentonites depending of the nature of the recovery process of oil and gas.

Surfactants are particularly useful in the injection fluid according to the invention because they may improve the efficiency of said fluid, especially in oil and gas recovery process. They are preferably chosen among anionic or cationic surfactants and betaines.

Thanks to the improved suspensive effect given by the composition of the invention to the injection fluid that contains particles such as proppants, encapsulated breakers, preformed particle gels, nanogels or microgels, said particles tends to be more stable in the injection fluid, and the sedimentation is greatly decreased.

In a third aspect, the present invention provides a method of treating a portion of subterranean formation comprising providing the composition of the invention, preparing an injection fluid with at least said composition, introducing the injection fluid into portion of the subterranean formation.

Treating a portion of a subterranean formation includes treating part of the subterranean formation or treating the entire subterranean formation.

In a fourth aspect, the invention provides a fracturing method comprising providing the composition of the invention, preparing a fracturing fluid with at least said composition and with at least a proppant, introducing the fracturing fluid into portion of the subterranean formation.

In a fifth aspect, the invention provides a polymer flooding method comprising providing composition of the invention, preparing a polymer flooding injection fluid with at least said composition, introducing the polymer flooding injection fluid into portion or the entire subterranean formation.

In a sixth aspect, the invention provides a method of improving the suspensive effect in an injection fluid comprising providing the composition of the invention, preparing the injection fluid by mixing said composition in water, sea water or brine, introducing the injection fluid into portion or the entire subterranean formation. The aqueous treatment fluid may be a fracturing fluid or a polymer flooding injection fluid.

More precisely, the invention provides a method of improving the suspensive effect in an injection fluid comprising providing the composition of the invention, preparing the injection fluid by mixing said composition in water, sea water or brine, wherein the resultant injection fluid has an improvement in suspensive effect, when compared to the same injection fluid in which the composition of the invention is replaced by a composition which is identical except that polymer B does not comprise acrylamide monomer units and between 1 and 15 mol % of ATBS and/or salt(s) thereof, and in which polymer B is not obtained by a polymerization step and a subsequent post treatment step.

More precisely, the invention provides a method of improving the suspensive effect in an injection fluid comprising providing the composition of the invention, preparing the injection fluid by mixing said composition in water, sea water or brine, wherein the resultant injection fluid has an improvement in suspensive effect, when compared to the same injection fluid in which the composition of the invention is replaced by a composition which is identical except that polymers A and B do not comprise hydrophobic monomer unit or hydrophobic macromonomer unit.

The composition of the invention may also be used in any subterranean treatment such as drilling operations, stimulation treatments, completion operations and enhanced oil recovery process.

In a preferred embodiment, the present invention provides a fracturing method comprising:
a. Providing the composition of the invention;
b. Adding said composition into an aqueous fluid to form an injection fluid;
c. Adding at least a proppant into the injection fluid either before or after step b;
d. Introducing the injection fluid into portion of the subterranean formation;
e. Fracturing portion of the subterranean formation with the injection fluid;
f. Recovering a mixture of gas, oil and aqueous fluid.

The composition of the invention may also be used advantageously in the paper making industry, in the water or sludge treatment industry, in the construction industry, in the mining industry, in the cosmetics, textile or detergency industry, in the agriculture.

The present invention will further be described by reference to the following examples. The following examples are merely illustrative of the invention and are not intended to be limiting. Unless otherwise indicated, all percentages are by weight (w %).

The invention claimed is:

1. A composition for preparing an injection fluid in oil and gas recovery, comprising:
    an inverse emulsion of an associative water-soluble polymer A comprising at least one hydrophobic monomer or one hydrophobic macromonomer, and
    solid particles of a water-soluble polymer B,
    wherein polymer A and/or polymer B comprises from 1 to 40 mol % of acrylamide tertiary butyl sulfonic acid (ATBS).

2. The composition according to claim 1, wherein water-soluble polymer A further comprises acrylamide; and wherein polymer B is associative and comprises acrylamide and at least one hydrophobic monomer or one hydrophobic macromonomer.

3. The composition according to claim 1, wherein polymer A is different from polymer B.

4. The composition according to claim 1, wherein polymer A and/or polymer B are obtained by Reversible Chain Transfer by addition-Fragmentation (RAFT) polymerization or controlled radical polymerization (CRP) or Macromolecular Design by Interchange of Xanthate (MADIX) techniques.

5. The composition according to claim 1, wherein the hydrophobic monomer is selected from the following lists:
    (meth)acrylic acid esters having an alkyl, arylalkyl and/or ethoxylated and/or propylated chain; derivatives of (meth)acrylamide having an alkyl, arylalkyl or dialkyl chain and/or ethoxylated and/or propoxylated chain; cationic allyl derivatives having an alkyl, arylalkyl or dialkyl chain and/or ethoxylated and/or propoxylated chain; anionic or cationic hydrophobic (meth)acryloyl derivatives; and anionic or cationic monomers derivatives of (meth)acrylamide bearing a hydrophobic chain;
    n-hexyl (meth)acrylate, n-octyl (meth)acrylate, octyl (meth)acrylamide, lauryl (meth)acrylate, lauryl meth) acrylamide, myristyl (meth)acrylate, myristyl (meth) acrylamide, pentadecyl (meth)acrylate, pentadecyl (meth)acrylamide, cetyl (meth)acrylate, cetyl (meth)

acrylamide, oleyl (meth)acrylate, oleyl (meth)acrylamide, erucyl (meth)acrylate, erucyl (meth)acrylamide, and combinations thereof;
cationic allyl derivatives having the general formula:

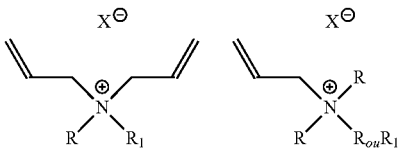

where
R: independently an alkyl chain containing 1 to 4 carbons,
R1: an alkyl or arylalkyl chain comprising 8 to 30 carbons,
X: a halide which may be a bromide, chloride, iodide, fluoride, or any negatively charged counter-ion,
and hydrophobic cationic derivatives of the methacryloyl type having the general formula:

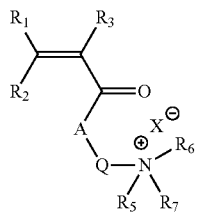

where
A: O or N—R4),
R1, R2, R3, R4, R5, R6: independently a hydrogen or an alkyl chain containing 1 to 4 carbons,
Q: an alkyl chain comprising 1 to 8 carbons,
R7: an alkyl or arylalkyl chain comprising 8 to 30 carbons,
X: a halide which may be a bromide, chloride, iodide, fluoride, or any negatively charged counter-ion;
LCST (Lower Critical Solution Temperature) and/or UCST (Upper Critical Solution Temperature) monomers or macromonomers;
hydrophobic monomers having the general formula CH2=CR1—COO-(EO)n-(PO)m-R2 in which R1 is hydrogen or methyl, n is a number of at least two, m is a number from zero to 50, EO is an ethylene oxide group (—CH2-CH2—O—), PO is a propylene oxide group (—CH2-CH(CH3)—O—) and R2 is a C8-C30 alkyl group or a C8-C30-alkaryl group.

6. The composition according to claim 1, wherein the concentration of hydrophobic monomers and hydrophobic macromonomers in mol % based on the total monomer and macromonomer content is comprised between 0.0001% and 10% for polymer A.

7. The composition according to claim 2, wherein the concentration of hydrophobic monomers and hydrophobic macromonomers in mol % based on the total monomer and macromonomer content is comprised between 0.0001% and 10% for polymer B.

8. The composition according to claim 1, wherein the mass ratio between the inverse emulsion of polymer A and the solid particles of polymer B is comprised between 1:1 and 10:1.

9. The composition according to claim 1, wherein the total concentration of polymer A and polymer B is comprised between 30 w % and 80 w %, based on the total weight of the composition.

10. The composition according to claim 2, wherein the concentration of acrylamide in polymer A and/or in polymer B, based on the total monomer and macromonomer content, is comprised between 5 and 99.9999 mol %.

11. The composition according to claim 1, wherein the water-soluble polymer A and/or the water-soluble polymer B contain additional monomers selected from non-ionic monomer(s) different from acrylamide, and/or anionic monomer(s), and/or cationic monomer(s), and/or zwitterionic monomers.

12. The composition according to claim 1, wherein polymer A and/or polymer B are post-treated with a hydrolyzing agent.

13. The composition according to claim 1, wherein the inverse emulsion is obtained by polymerization carried out partially or totally at a pressure comprised between 0.1 and 200 mbar.

14. The composition according to claim 1, wherein the solid particles of the water-soluble polymer B are in the form of powder, fines, granules or beads.

15. Injection fluid made by mixing water or brine with the composition of claim 1,
wherein, in said injection fluid, the total amount of polymer A and polymer B is comprised between 0.0005% w to 1% w.

16. A method of treating a portion of subterranean formation comprising providing a composition according to claim 1, preparing an injection fluid with at least said composition, and introducing the injection fluid into a portion of the subterranean formation.

17. A fracturing method comprising providing a composition according to claim 1, preparing a fracturing fluid with at least said composition and with at least a proppant, and introducing the fracturing fluid into a portion of the subterranean formation.

18. A polymer flooding method comprising providing a composition according to claim 1, preparing a polymer flooding injection fluid with at least said composition, and introducing the polymer flooding injection fluid into a portion of, or an entire subterranean formation.

19. A method of improving the suspensive effect in an injection fluid comprising providing a composition according to claim 1, preparing the injection fluid by mixing said composition in water, sea water or brine, and introducing the injection fluid into a portion of or an entire subterranean formation.

20. A composition for preparing an injection fluid in oil and gas recovery, comprising:
an inverse emulsion of an associative water-soluble polymer A comprising at least one hydrophobic monomer or one hydrophobic macromonomer, and
solid particles of a water-soluble polymer B,
wherein the hydrophobic monomer or macromonomer is N-methacrylamidopropyl-N,N-dimethyl-N-dodecyl ammonium bromide.

* * * * *